UNITED STATES PATENT OFFICE.

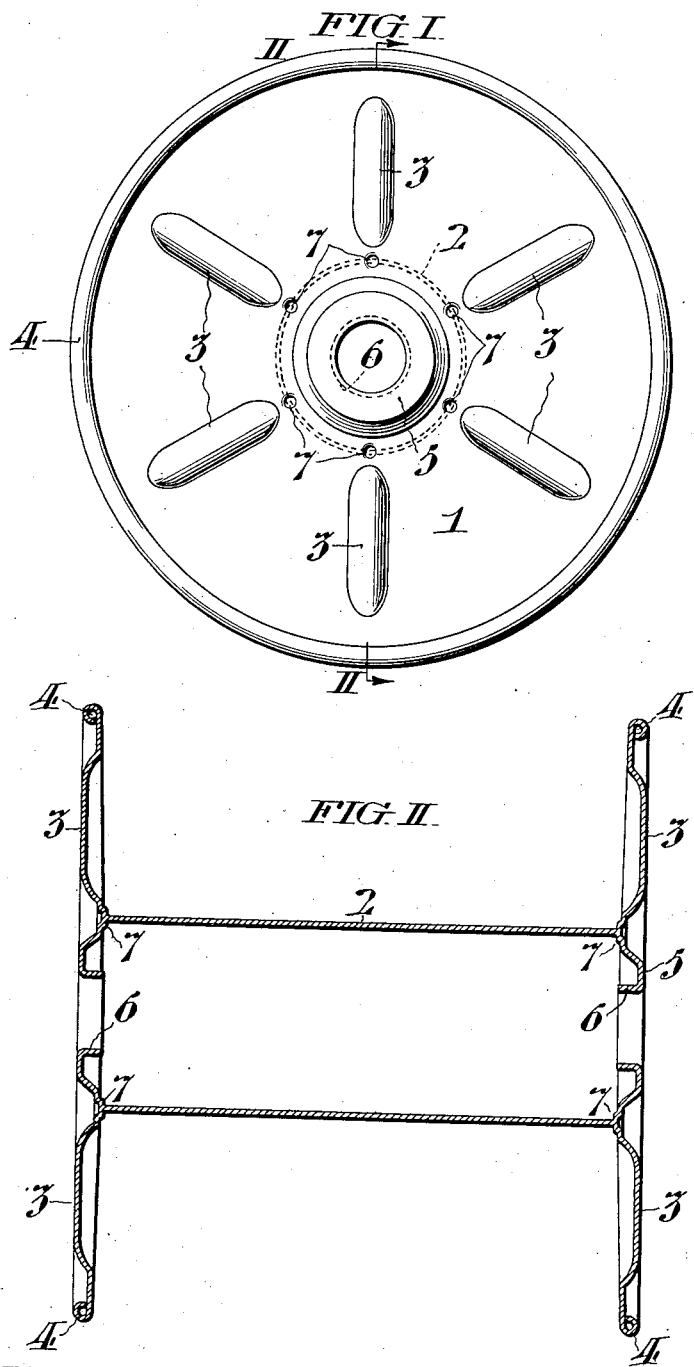

CHARLES A. BRINLEY, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

SHEET-METAL SPOOL.

No. 877,398.    Specification of Letters Patent.    Patented Jan. 21, 1908.

Application filed July 15, 1907. Serial No. 383,793.

*To all whom it may concern:*

Be it known that I, CHARLES A. BRINLEY, residing at No. 247 South Sixteenth street, in the city of Philadelphia, county of Philadelphia, and State of Pennsylvania, have invented certain new and useful Improvements in Metal Spools, whereof the following is a specification, reference being had to the accompanying drawings.

The object of my invention is to provide a spool-shaped structure of sheet metal, the component elements being so organized as to permit their union by electric welding.

I will describe a convenient embodiment of my invention which I have illustrated in the drawings.

In said drawings, Figure I represents an end view of the spool. Fig. II is a longitudinal central section through the same, on a plane passing through the line II—II of Fig. I.

The spool comprises three elements, to wit, two similar disks 1, and a cylindrical drum 2, and is formed by electrically welding a disk to each end of the drum. As indicated, all of these parts are made of sheet metal. The end disks as shown in the drawings are provided with elongated radial dished portions 3, to give the disk greater rigidity. The peripheral edges of the disks may be turned over into a bead as indicated at 4, or may be plain or flanged or otherwise finished.

The central part of each disk is preferably so formed as to afford a proper bearing surface for mounting the spool upon a shaft or spindle. Thus as shown in the drawings, each disk is provided with a concentric annular outwardly dished portion 5, with an inwardly extending annular band 6, but the bearing may be formed in any other known way.

A relatively limited number of small inwardly extending projections are formed in annular relation to each other upon that region of each of the disks where attachment is to be made between the disks and the drum. In Fig. I, the regions of such projections are indicated by the small circles marked 7. Said projections are substantially obliterated in the process of uniting the drum to the disks, as hereinafter described, and hence do not appear as projections in Fig. II. In the instance shown, said projections are six in number upon each disk, and they are symmetrically arranged with relation to the radial dished portions 3, but the number and the position may be varied within reasonable limits.

The drum of the spool is formed of a sheet of metal, whose meeting edges need not be directly secured to one another, but should be in close contact, and said drum is united at its ends to the metal of the disks at points corresponding to the projections 7, by electric welding. I have found that an integral union entirely sufficient for the purposes of a spool, can be obtained by thus limiting the regions of the electric welding to a relatively small number of points projecting from the surface of the disk, and that the projections substantially disappear or are merged with the surface of the metal of the disk under the pressure incident to the welding process.

Instead of providing the disks with projections in the region indicated, a similar series of small projections may be formed around the edges which form the ends of the drum, such projections similarly disappearing or being merged with the metal under the pressure incident to the welding process.

I am aware that the method of electric welding at a number of projecting points is not broadly new, and I do not claim the same, nor do I broadly claim the application of this method to a sheet metal structure. I have found however, that by availing myself of this method of electric welding in connection with the structural elements above set forth, I can produce with great economy the spool above described, which possesses the advantages of extreme lightness and sufficient strength for all the purposes of use.

I claim:

1. In a spool, the combination of an axial drum of sheet metal, and end disks of sheet metal, each disk having a central opening, and integrally welded to said drum at a plurality of limited regions symmetrically disposed with relation to the center of the disks, substantially as set forth.

2. A sheet metal spool comprising an axial drum; end disks with concentric circular openings; and inwardly extending annular bands surrounding said openings respectively; said drum being integrally welded at each end to one of the disks at a plurality of limited regions.

3. In a spool, the combination of an axial drum of sheet metal, and end disks of sheet metal, integrally welded to said drum at a plurality of limited regions symmetrically disposed with relation to the center of the disks, substantially as set forth.

In testimony whereof, I have hereunto signed my name, at Philadelphia, Pennsylvania, this tenth day of July 1907.

CHARLES A. BRINLEY.

Witnesses:
   RUSSELL H. BOWEN,
   CHARLES E. BRINLEY.